United States Patent [19]

Weinzimer et al.

[11] 4,169,307
[45] Oct. 2, 1979

[54] CLINCH TOOL AND METHOD

[75] Inventors: Donald H. Weinzimer, New York; Edwin G. Krakauer, Roslyn Heights, both of N.Y.

[73] Assignee: Kay Springs, Inc., Syosset, N.Y.

[21] Appl. No.: 880,045

[22] Filed: Feb. 22, 1978

[51] Int. Cl.² ............... B23P 11/00; B21F 27/08; B21F 15/06; B21F 33/04
[52] U.S. Cl. .................... 29/243.56; 140/3 CA; 140/11; 140/93 D; 140/116
[58] Field of Search ............. 29/243.56; 140/3 CA, 140/11, 53, 54, 55, 57, 93 D, 116, 117; 5/259 B, 267

[56] References Cited

U.S. PATENT DOCUMENTS

| | | | |
|---|---|---|---|
| 648,239 | 4/1900 | Church | 140/11 |
| 744,166 | 11/1903 | Church | 140/116 |
| 792,083 | 6/1905 | Smith | 5/259 R |
| 1,508,313 | 9/1924 | White et al. | 140/11 |
| 1,512,990 | 10/1924 | Lehmann et al. | 140/11 |
| 2,048,460 | 7/1936 | Moffett | 140/57 |
| 2,208,819 | 7/1940 | Smith | 140/93 D |
| 3,851,371 | 12/1974 | Plunkett | 140/93 D |
| 3,864,804 | 2/1975 | Kawaguchi | 29/243.56 |

Primary Examiner—E. M. Combs

[57] ABSTRACT

A clinch tool and method for clamping a grid frame to a coil in which a clinch component is fed automatically into a space formed by the tool between the grid frame and coil with the clinch component saddled in position on the grid frame to be bent to retain the coil in a locked condition to the grid frame.

9 Claims, 9 Drawing Figures

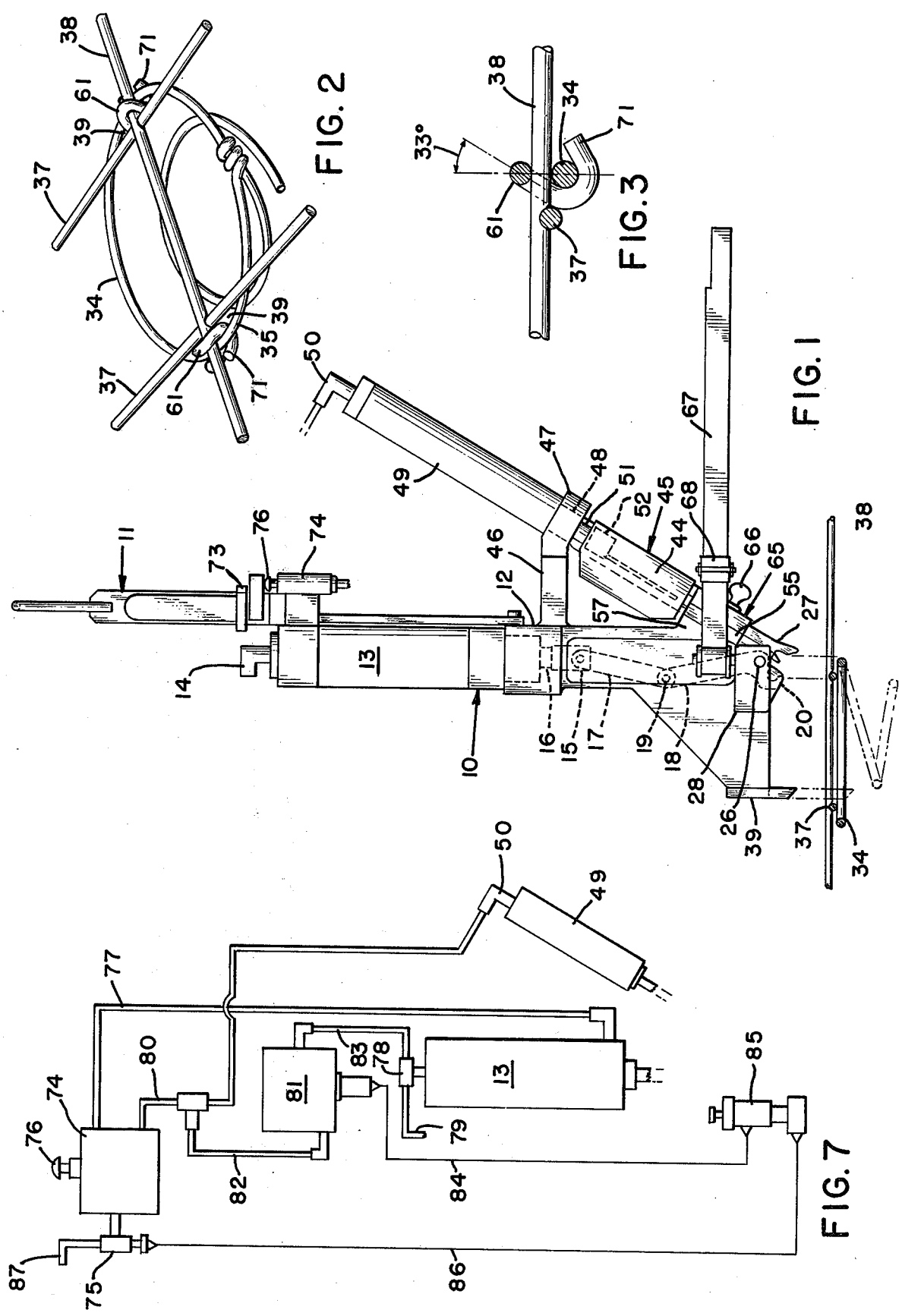

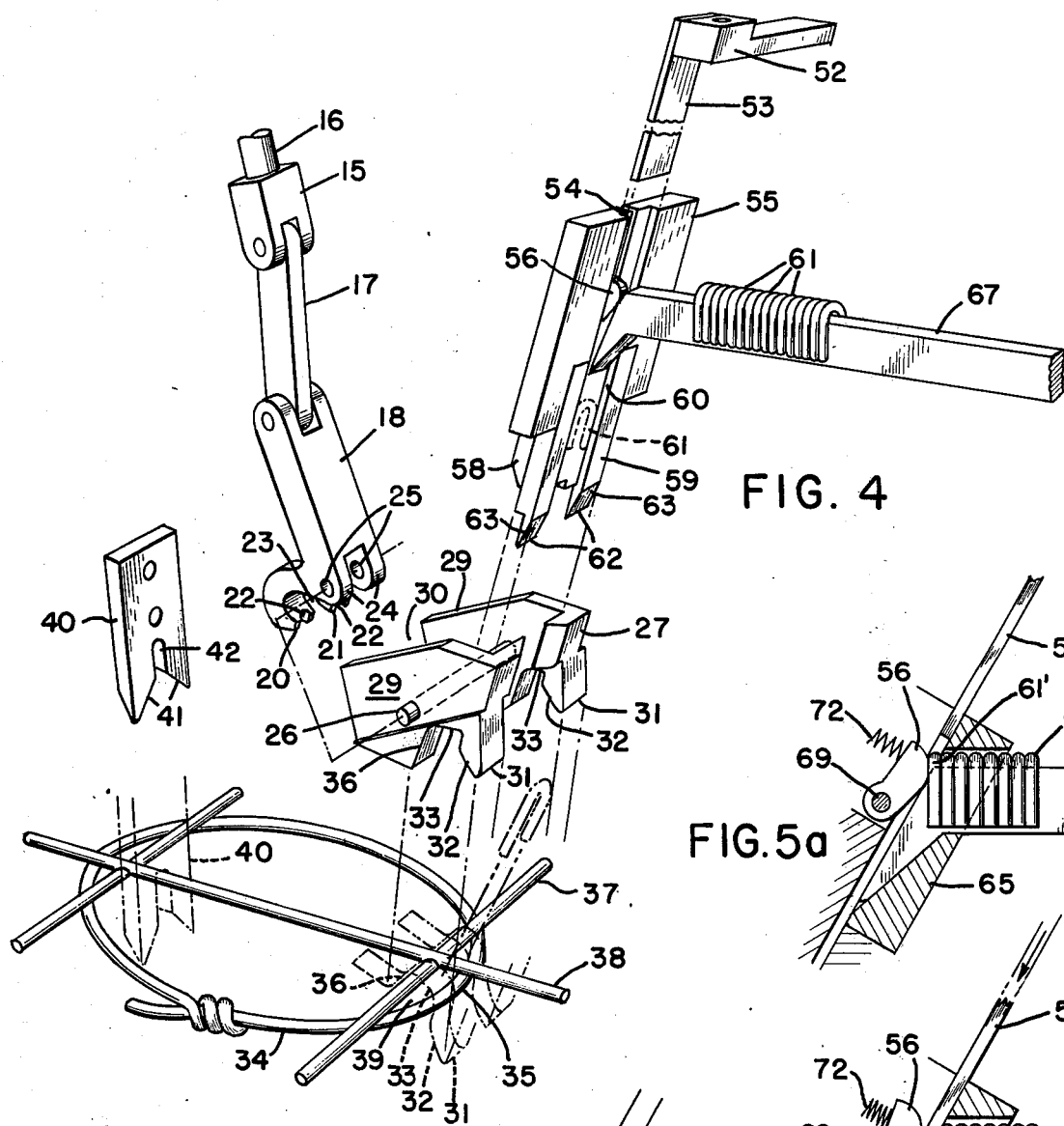

CLINCH TOOL AND METHOD

BACKGROUND AND INVENTION OBJECTIVES

Fabrication of boxsprings and other similar structures in which a wire cross-grid structural frame is secured to a series of single cone (conical) coils is costly and time consuming. The high incidence of hand labor involved will be readily apparent upon considering the necessity for properly and uniformly spacing the elements to achieve proper and consistent resilience in the completed structure. It is necessary to space the elements forming the boxspring uniformly and the elements must be assembled utilizing suitable clamping members that securely fasten the individual coils to the grid frame without slippage or slack which would promote noisy vibrations upon flexure when the boxspring is subjected to repeated loading cycles during the life of the boxspring.

For the most part, many of the operations in assembling a boxspring necessitate hand labor and the utilization of small hand tools with the necessary dexterity which can only be achieved through long experience in the same repetitive operations. Some automatic tools are available for some procedures but they have not met with any degree of acceptance in the industry. Uniformly secure clamping is essential for any automatic tool which, of necessity, in the fabrication of a boxspring, must be durable and highly productive with minimum maintenance or repair since the tools will usually be operated by unskilled or semi-skilled workers.

The clinch tool of this invention is preferably airpowered and is designed to align the wire cross-grid structural framework relative to each single cone (conical) coil which is to be affixed with a predetermined spacing between the coil and the cross-grid to form a chordal segment into which predetermined spacing a clinch member will be seated and supported on the cross-grid upon insertion into the chordal segmental spacing preliminary to bending the seated clinch member about the coil.

The supply of clinch members from a magazine will enable the clinch tool to insert a single clinch member in a directed path of travel by guiding it and retaining it until seated in a final position before the clinch member is clinched in a final condition sequentially to lock the coil to a wire cross-grid structural frame.

The clinch tool and method may be advantageously utilized with the bed spring unit disclosed in pending U.S. application Ser. No. 771,038 filed on Feb. 22, 1977 of Edwin G. Krakauer, now U.S. Pat. No. 4,114,212.

DESCRIPTION OF DRAWINGS

A preferred embodiment of the clinch tool is shown and described in the accompanying drawings and specification in which like characters of reference designate corresponding parts throughout the several views, and the specific terminology employed is not intended for purposes of limitation with the scope of the invention being defined by the claims, and in which:

FIG. 1 is a side elevational view of a clinch tool vertically suspended in spaced relative inoperative position to a partial cross-grid framework mounted on a partial coil for affixation thereto;

FIG. 2 is a partial perspective view of a cross-grid framework secured to a coil by bent spaced-apart clinch components supplied and bent by the clinch tool in which the clinch component is inserted in a chordal segmental spacing formed by a cross-grid wire and an arc of the coil;

FIG. 3 is an enlarged partial sectional view of a wire cross-grid, coil and clinch component in the final clinched position;

FIG. 4 is an exploded perspective view of the clinch tool in position above a section of a wire cross-grid framework and coil section illustrating, in outline form, the positioning of the tool-engaging members on the grid and coil, and the displacement path of a clinch component;

FIGS. 5a, 5b, and 5c are schematic illustrations of the clinch component magazine feed, retaining member and displacing blade and guide in sequence;

FIG. 6 is an enlarged partial sectional view of the clinch tool closing jaw bending a seated and restrained clinch element about a coil in the chordal spacing; and FIG. 7 is a schematic view of a pneumatic system and circuit for supplying and actuating the mechanisms of the clinch tool.

DESCRIPTION OF PREFERRED EMBODIMENT OF INVENTION

Referring to the drawings and particularly to FIG. 1, there is shown a clinch tool 10 that is air powered and supported on a spring balancer 11 to counter-balance the weight of the suspended clinch tool 10, with a portion of the balancer not shown since it is a conventional apparatus.

The clinch tool body 12 supports a main air cylinder 13 which receives a supply of air under pressure through the inlet fitting 14, at the upper end of the cylinder 13. A vertically displaceable clevis joint 15 is mounted on the end of the piston rod 16 that is vertically displaced through a piston vertically slidable in the cylinder 13. The clevis joint 15 is pivotally connected to the clevis link 17 through a suitable bearing and retaining ring and locking mechanism (not shown). A clinch component closing jaw 18 is pivotally connected to clevis link 17 about the pivot pin 19 with the jaw 18 having a pair of laterally spaced-apart hook-like projecting prongs 20 and 21 with each of the prongs being provided with a clinch leg-receiving indentation 22. The prongs 20 and 21 are spaced-apart to provide a grid wire-receiving recess 23 therebetween as shown in FIG. 4. The closing jaw 18 is provided adjacent to its terminal end with a pair of projecting lugs 24 which have pivot pin-receiving openings 25 to cooperatively receive the pivot pin 26 positioned in the grid guide and coil stop member 27 secured to the base 28 of the clinch body 12.

The grid guide and coil stop member 27 is provided with laterally spaced walls 29 with a closing jaw-receiving opening 30 therebetween as shown in FIG. 4. A pair of downwardly extending cam lugs 31 is laterally spaced from each other on the stop member 27 with the camming surface 32 on each lug 31 being inclined rearwardly to the grid and coil spacing recess and stop 33.

In the seated position of the coil stop member 27, as shown in outline form in FIG. 4, the cam surface 32 on the lug 31 will engage the circular upper coil 34 in a relatively short arcuate portion 35 with the rear stop 36 engaging and urging the wire cross-grid member 37 into a predetermined spacing to form a chordal segmental space 39 between the cross grid member 37 and the arc 35. The other wire grid member 38 which is spot welded at the intersection of the cross-grid members 37 and 38 will be positioned between the depending lugs 31 and fit into the recess 23 in the jaw member 18 thereby positioning and stabilizing as well as spacing the tool 10 in position while simultaneously forming the chordal segmental space 39. A rear guide member 40 is secured to the body member 12 and extends downwardly. The rear guide member 40 is provided with a pair of spaced camming lugs 41 which are inwardly inclined to the vertical recess 42 which recess 42 cooperatively engages the cross grid member 38 to stabilize the tool 10 in position and maintain the spacing by the coil stop member 27.

The rear guide member 40 is shown in outline form in position on the wire cross grid member 38, in FIG. 4.

A clinch component supply assembly 45 is supported at an acute angle, preferably approximately 33 degrees from the vertical position of the clinch tool 10 as shown in FIG. 1, by means of the bracket 46 that extends laterally from the body member 12 with the free end 47 of the bracket 46 having an air-cylinder receiving bore 48 that supports the clinch drive air cylinder 49 which is supplied with air under pressure through the fitting 50 at the upper end thereof. A piston rod 51 extends from a piston (not shown) and is secured to the valve trip block 52 which is provided with a downwardly extending clinch drive blade 53 that is secured to the block 52 with the blade 53 extending into a blade-receiving longitudinal slot 54 in the feed mount supporting block 55 in which the clinch detent 56 is pivotally mounted and spring biased outwardly into the slot 54. The feed block 55 is supported on the tool body member 12 at the lower inclined section 57. The feed block member 55 is provided with a downwardly extending feed mount 58 on which the feed mount insert 59 is supported by suitable fastening means (not shown) with the feed mount insert 59 being provided with a continuation clinch component guide slot 60 which aligns with the slot 54 in the feed block member 55 to guide a clinch component 61 downwardly along a directed path of travel. A pair of depending spaced camming prongs 62 have inclined cam faces 63 for cooperatively entering between the walls 29 of the coil stop member 27 and into the chordal segmental spacing 39 to maintain the spacing between the coil 34 in the arc 35 and the cross-grid member 37 as shown in FIG. 6. A removable guard 44 encloses the block 52.

A feed block assembly 65 is mounted on the block 55 through the thumb screw 66 for retention thereon and to support the clinch component magazine 67 on which the magazine feed pusher member 68 travels to urge the clinch components 61 supported on the magazine track 67 toward the clinch detent 56 as shown in FIGS. 4 and 5a. The magazine feed pusher 68 urges the clinch component 61 against the clinch detent 56 against the action of spring 72 which retains the clinch component 61 in the inactive but ready position shown in FIG. 5a. Sufficient bias is exerted by the spring 72 against the clinch detent 56 to retain the clinch components in position on the magazine track 67. Upon actuation of the piston in the cylinder 49, the valve trip block 52 will be forced downwardly and the clinch drive blade 53 will engage and displace the leading clinch component 61' downwardly, as shown in FIG. 5b, against the biasing action of the clinch detent 56 which is pivoted counter-clockwise about the detent pivot pin 69. The clinch drive blade 53 will displace only a single clinch component 61 at a time and the clinch component 61' will be guided in its downward travel in an erect position through the inclined cam surface 70 in the feed block assembly 65 as it is directed downwardly through the slot 60 in the feed insert member 59, as shown in FIGS. 4 and 5c, as the blade 53 descends downwardly to force the clinch component 61 into a seated position straddling the wire cross grid-member 38 and penetrating into the chordal segmental space 39 by the projecting spaced legs 71 on each of the clinch components 61. Upon seating of the clinch component 61, the clevis member 15 will be forced downwardly by air pressure from cylinder 13 to pivot the closing jaws in a counter-clockwise direction about the pivot pin 26 with the hook-like members 20 engaging the legs 71 of the clinch component 61 in the respective leg-engaging indentations 22. With further pivoting of the closing jaw member, the legs 71 of the clinch component 61 will at least partially encircle the wire coil 34, as shown in the completed locked position of FIGS. 2 and 3.

After the closing jaw member 18 has completed full bending of the legs 71 of the clinch component 61, the component drive blade 53 will retract to the position shown in FIG. 5a and the closing jaw member 18 will pivot in a clockwise direction to the position shown in FIG. 1 for commencement of the next cycle of operation.

There is illustrated in FIG. 2 one section of a top portion of a spring assembly in which the cross-grid members 37 and 38 which form the cross-grid framework are secured to the coil 34 by means of the clinch component 61 which passes through the chordal segmental spacing 39 and saddled on the cross grid-wire member 38 with the legs 71 being turned upwardly and outwardly to engage and retain the coil 34 in the arc 35 in engagement with the wire member 38 at spaced positions thereon.

It has been found for the particular construction illustrated that the clinch components are preferably fed at an acute angle, preferably at an angle of approximately 33 degrees from the vertical, into the spacings 39. The angle of 33 degrees is used for the purpose of this disclosure primarily since it approximates the final orientation of that portion of the clinch component which remains unformed as illustrated in FIG. 3. The center line between the clinch component straddling the wire grid 38 and the coil beneath it and normal to the grid wire 38 would be perpendicular to the grid wire 38 for maximum tightness. The objective is to prevent the clinch component from rotating or becoming loosely oriented. Depending upon the particular cross-grid and coil dimensions, this angle of 33 degrees from the vertical may be modified relative to the vertical position of the tool as illustrated in FIG. 1.

With the clinch tool positioned as shown in FIG. 1, the switch handle 73 that operates the air valve 74 through the spring-biased plunger 76 will admit air into the clinch drive cylinder 49 which will urge the valve trip block 52 and the associated clinch drive blade 53 downwardly to engage and displace a clinch component 61 through the feed mount insert member 59 to position and seat a clinch component 61 at the proper angle so that the legs 71 straddle the wire grid 38 in the spacing 39 with the clinch component being maintained in position securely. When the clinch drive blade 53 bottoms the clinch component in the seated position, it actuates a valve 85 admitting air into the main air cylinder 13 which then forces the closing jaw member 18 to pivot in a counter-clockwise direction, as shown in FIG. 6, to engage the clinch component leg members 71 and force them around the coil 34 using the coil as a bending anvil, and the feed channel 54 as the reaction member. The camming prongs 62 assist in maintaining the clinch components 61 in position without spreading.

The pneumatic system is schematically shown in FIG. 7 in which the compressed air is supplied at inlet 87 and is immediately divided by tee 75 to air valve 74 and through line 86 to air valve 85. In the unactivated position shown, valve 74 directs the compressed air through supply line 77 to the return stroke inlet of cylinder 13. Valve 85 is in a closed position so that the compressed air in supply line 86 is stopped at the valve 85. The forming cycle is initiated by depressing the plunger of valve 74 which opens supply line 77 to the atmosphere allowing the pressure therein to exhaust and at the same time applies pressure to line 80 which in turn is divided and supplies air under pressure to both valve 81 and cylinder 49. Cylinder 49 immediately drives the clinch drive blade 53 downwardly to position and seat a clinch component 61 securely in its final position. When the clinch drive blade 53 bottoms the clinch component 61 in the seated position, it actuates valve 85 which then passes compressed air through line 84 to the air-powered operator of valve 81 which in turn allows compressed air to pass through it and through line 83 into main drive cylinder 13. This forces the closing jaw member 18 through its working cycle. Air passing from line 83 into cylinder 13 must pass through quick exhaust valve 78. Exhaust valve 78 serves to exhaust the air quickly from cylinder 13 through its own opening 79 to the atmosphere to allow for rapid return of the piston of cylinder 13. This occurs after the clinch component is fully bent and the valve 74 is released, allowing the compressed air to exhaust from line 80 and all other pressurized components and putting pressure back into line 77.

The method of securing the metal wire filaments of the coil 34 and the grid wire 38 necessitates these members be juxtaposed to receive the U-shaped clinch connector components 61 so that the spaced depending legs 71 will be inserted into the formed chordal spacing 39 in the seated position. The legs 71 will then be bent upwardly to fasten the juxtaposed members securely together without moving, pivoting or rotating in position upon repeated flexures of the assembled frame.

We claim:

1. An automatic clinching tool for supplying, inserting, spacing and securing a connector component to form a united cross-grid and coil frame structure comprising: a body frame, means mounted on said body frame for spacing and retaining a cross-grid and coil to form a connector component-receiving chordal segmental space, said spacing and retaining means including a coil stop member and a rear guide member, said coil stop member having a coil-engaging lug and a rear stop member, a connector component-engaging closing jaw means in juxtaposition with said spacing and retaining means and having means for displacing said closing jaw means, a connector component supply means having a connector component slot means for guidably positioning individual connector components in a predetermined path, said connector component slot means being acutely angled relative to said body frame whereby said connector component is seated on said cross grid in said segmental space while said component-engaging closing jaw means engages said seated connector component to bend said connector component thereby locking said cross grid and said coil together.

2. An automatic clinching tool as claimed in claim 1, and a means for driving each connector component in said predetermined path to a seated position.

3. An automatic clinching tool as claimed in claim 2, said driving means including a clinch drive blade and fluid means for displacing said clinch drive blade to engage and displace each connector component.

4. An automatic clinching tool as claimed in claim 1, said connector component-engaging closing jaw means being pivotally mounted to said body frame, and fluid means for activating said closing jaw means after said connector component is in a seated position.

5. An automatic clinching tool as claimed in claim 1, said connector component-engaging closing jaw means having a pair of laterally spaced-apart hook-like means for engaging and retaining a connector component in position throughout connector component bending.

6. An automatic clinching tool as claimed in claim 1, said connector component supply means including means for yieldably biasing said series of connector components from displacement, and means for driving each connector component overcoming said biasing means including a clinch drive blade and fluid means for displacing said clinch drive blade to engage and displace each connector component individually to said seated position.

7. An automatic clinching tool as claimed in claim 1, and means on said body frame in spaced relation to said grid guide and coil stop means fo positioning and aligning said body frame on a cross-grid.

8. An automatic clinching tool as claimed in claim 1, means for driving each connector component in said predetermined path to a seated position, said driving means including a clinch drive blade and fluid means for displacing said clinch drive blade to engage and displace each connector component, said connector component-engaging closing jaw means having a pair of laterally spaced-apart hook-like means for engaging and retaining an individual connector component in position throughout connector component bending about a cross grid and coil, said closing jaw means being pivotable within said spacing and retaining means, said connector component supply means including means for yieldably biasing said connector component from displacement, and means for driving each said connector component overcoming said biasing means including a clinch drive blade and fluid means for displacing said clinch drive blade to engage and displace each said connector component to said seated position.

9. A method of clamping a cross-grid and coil together with a U-shaped connector component having spaced depending legs to form a cross-grid coil frame structure comprising the steps of: supporting a cross-grid on a coil, positioning the cross-grid and coil to form a chordal segmental spacing between one element of said cross-grid and coil having first and second elements forming a right angle and coil, engaging and stabilizing said cross-grid rearward of said chordal segmental spacing, inserting a connector component at an acute angle to the second element of said cross-grid in said chordal segmental spacing and seating it to straddle said second element, said connector component legs extending through said chordal segmental spacing, and bending the connector component legs straddling said second element to engage and lock said coil and said second element of said cross-grid together on opposite sides of said second element of said cross-grid.

* * * * *